US012759721B1

(12) United States Patent
Yazici et al.

(10) Patent No.: US 12,759,721 B1
(45) Date of Patent: Oct. 13, 2026

(54) THERMAL MANAGEMENT ASSEMBLY FOR A HYBRID-ELECTRIC AIRCRAFT PROPULSION SYSTEM

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/274,179

(22) Filed: Jul. 18, 2025

(51) Int. Cl.
*B64D 33/00* (2006.01)
*B64D 27/33* (2024.01)
*B64D 33/08* (2006.01)

(52) U.S. Cl.
CPC ............. *B64D 33/08* (2013.01); *B64D 27/33* (2024.01)

(58) Field of Classification Search
None
See application file for complete search history.

(56) References Cited

U.S. PATENT DOCUMENTS 8,300,412 B2 10/2012 Pal
8,418,471 B2 4/2013 Baltas
10,968,830 B2 4/2021 Snyder
11,384,649 B1 7/2022 Rambo
2007/0157597 A1* 7/2007 Sharp ...................... F01D 15/10 60/226.1
2010/0300066 A1* 12/2010 Bulin ...................... F02K 3/06 60/267
2014/0360205 A1* 12/2014 French ...................... F02C 9/00 290/46
2015/0252728 A1* 9/2015 Veiga ...................... F02C 7/20 415/213.1
2019/0128189 A1* 5/2019 Rambo ...................... F02K 3/115
2019/0257247 A1* 8/2019 Pal ...................... F02C 7/18
2025/0136288 A1* 5/2025 Pirnar ...................... B64D 33/08
2025/0290452 A1* 9/2025 Glessner ...................... F02C 7/32

* cited by examiner

*Primary Examiner* — Edwin Kang
(74) *Attorney, Agent, or Firm* — Getz Balich LLC

(57) ABSTRACT

A propulsion system includes a gas turbine engine, a nacelle, a bifurcation, an electrical assembly, and a thermal management assembly. The gas turbine engine includes a rotational assembly and an engine static structure. The engine static structure houses the rotational assembly. The nacelle forms an annular bypass duct radially between the engine static structure and the nacelle. The bifurcation extends between the engine static structure and the nacelle. The electrical assembly includes an electric machine and a control unit. The electric machine is coupled with the rotational assembly. The control unit is electrically connected to the electric machine. The control unit is disposed within the bifurcation. The thermal management assembly includes a control unit cooling circuit. The control unit cooling circuit is connected in fluid communication with and formed by the control unit. The control unit cooling circuit is disposed within the bifurcation.

17 Claims, 6 Drawing Sheets

THERMAL MANAGEMENT ASSEMBLY FOR A HYBRID-ELECTRIC AIRCRAFT PROPULSION SYSTEM

BACKGROUND

1. Technical Field

This disclosure relates generally to hybrid-electric propulsion systems for aircraft and, more particularly, to cooling systems for electric machine assemblies.

2. Background Information

Hybrid-electric propulsion systems for aircraft include electrical equipment, such as electric machines, configured to operate with an engine to provide thrust for an associated aircraft. This electrical equipment may typically require complex thermal management to facilitate reliable operation in view of the varying temperature extremes and operating conditions experienced by aircraft propulsion systems. Various thermal management systems and methods for hybrid-electric aircraft propulsion systems are known in the art. While these known systems and methods may be useful for their intended purposes, there is always room in the art for improvement.

SUMMARY

According to an aspect of the present disclosure, a hybrid-electric aircraft propulsion system includes a gas turbine engine, a nacelle, a bifurcation, an electrical assembly, and a thermal management assembly. The gas turbine engine has an axis. The gas turbine engine includes a first rotational assembly and an engine static structure. The first rotational assembly includes a first shaft, a bladed first compressor rotor, and a bladed first turbine rotor. The first shaft interconnects the bladed first compressor rotor and the bladed first turbine rotor. The engine static structure houses the first rotational assembly. The nacelle forms an exterior aerodynamic housing of the hybrid-electric aircraft propulsion system and circumscribes the gas turbine engine. The nacelle forms an annular bypass duct radially between the engine static structure and the nacelle. The bifurcation extends radially through the annular bypass duct between the engine static structure and the nacelle. The electrical assembly includes a first electric machine and a first control unit. The first electric machine is coupled with the first rotational assembly. The first control unit is electrically connected to the first electric machine. The first control unit is disposed within the bifurcation. The thermal management assembly includes a control unit cooling circuit. The control unit cooling circuit is connected in fluid communication with and formed by the first control unit. The control unit cooling circuit is disposed within the bifurcation.

In any of the aspects or embodiments described above and herein, all of the control unit cooling circuit may be disposed within the bifurcation.

In any of the aspects or embodiments described above and herein, the thermal management assembly may further include a coolant pump, the coolant pump may be connected in fluid communication with and further form the control unit cooling circuit, and the coolant pump may be disposed within the bifurcation.

In any of the aspects or embodiments described above and herein, the thermal management assembly may further include a coolant tank, the coolant tank may be connected in fluid communication with and further form the control unit cooling circuit, and the coolant tank may be disposed within the bifurcation.

In any of the aspects or embodiments described above and herein, the propulsion system may include an upper bifurcation and a lower bifurcation each extending radially between the engine static structure and the nacelle, and the lower bifurcation may be the bifurcation.

In any of the aspects or embodiments described above and herein, the gas turbine engine may further include a second rotational assembly, the second rotational assembly may include a second shaft, a bladed second compressor rotor, and a bladed second turbine rotor, the second shaft may interconnect the bladed second compressor rotor and the bladed second turbine rotor, the electrical assembly may include a second electric machine and a second control unit, the second electric machine may be coupled with the second rotational assembly, the second control unit may be electrically connected to the second electric machine, and the control unit cooling circuit is further connected in fluid communication with and formed by the second control unit.

In any of the aspects or embodiments described above and herein, the first control unit and the second control unit may be connected in parallel by the control unit cooling circuit.

In any of the aspects or embodiments described above and herein, the bifurcation may include a bifurcation body housing the first control unit and the thermal management assembly, the bifurcation body may form an outer side surface of the bifurcation, the first control unit may include a plurality of plate fins extending from the first control unit through the bifurcation body to the outer side surface, and the plurality of plate fins may be disposed at the control unit cooling circuit within the first control unit.

In any of the aspects or embodiments described above and herein, the bifurcation body may include a first circumferential side wall and a second circumferential side wall, the first control unit may be mounted on the first circumferential side wall, and the plate fins may extend through the first circumferential side wall and the outer side surface.

In any of the aspects or embodiments described above and herein, the bifurcation may include a conduit extending through the bifurcation, the conduit may form an air passage, and the first control unit may include a plurality of plate fins extending from the first control unit through the conduit to the air passage.

In any of the aspects or embodiments described above and herein, the bifurcation may include a bifurcation body, the bifurcation body may include a leading edge, and the conduit may form an air inlet of the air passage at the leading edge.

In any of the aspects or embodiments described above and herein, the bifurcation may include a conduit extending through the bifurcation, the conduit may form an air passage, the thermal management assembly may include an air-coolant heat exchanger further forming the control unit cooling circuit, and the air-coolant heat exchanger may be connected in fluid communication with air passage.

In any of the aspects or embodiments described above and herein, the bifurcation may include a conduit extending through the bifurcation, the conduit may form an air passage connected in fluid communication with the thermal management assembly, the thermal management assembly may further include a modulation valve at the air passage, and the modulation valve may be positionable in an open position, a closed position, and a plurality of intermediate positions.

In any of the aspects or embodiments described above and herein, the hybrid-electric aircraft propulsion system may further include a controller connected in communication with the modulation valve and a temperature sensor disposed at the control unit cooling circuit, the controller may include a processor connected in signal communication with a non-transitory memory storing instructions which, when executed by the processor, cause the processor to determine a coolant temperature using the temperature sensor and control a position of the modulation valve based on the coolant temperature.

According to an aspect of the present disclosure, a method of thermally managing an electrical assembly of a hybrid-electric aircraft propulsion system including a gas turbine engine and a nacelle includes circulating a coolant through a control unit cooling circuit in fluid communication with a control unit of the electrical assembly. The control unit is electrically connected to an electric machine. The electric machine is mechanically coupled with a propulsor of the gas turbine engine. The control unit and the control unit cooling circuit are disposed within a bifurcation connecting the nacelle and an engine static structure of the gas turbine engine. The method further includes directing a bypass air flow from the propulsor to the bifurcation and transferring heat from the coolant to the bypass air flow at the bifurcation.

In any of the aspects or embodiments described above and herein, directing the bypass air flow from the propulsor to the bifurcation may include directing the bypass air flow across an exterior of the bifurcation, and transferring heat from the coolant to the bypass air flow at the bifurcation may include transferring heat from the coolant to the bypass air flow at the exterior.

In any of the aspects or embodiments described above and herein, directing the bypass air flow from the propulsor to the bifurcation may include directing the bypass air flow through an interior of the bifurcation, and transferring heat from the coolant to the bypass air flow at the bifurcation may include transferring heat from the coolant to the bypass air flow at the interior.

According to another aspect of the present disclosure, a hybrid-electric aircraft propulsion system includes a propulsor, an engine, a nacelle, a bifurcation, an electrical assembly, and a thermal management assembly. The engine is coupled with the propulsor. The engine includes an engine static structure. The nacelle forms an exterior aerodynamic housing the engine. The bifurcation extends between the engine static structure and the nacelle. The bifurcation includes a bifurcation body extending between a leading edge and a trailing edge. The bifurcation body includes a first circumferential side wall and a second circumferential side wall extending from the leading edge toward the trailing edge. The electrical assembly includes a first electric machine and a first control unit. The first electric machine is coupled with the propulsor. The first control unit is electrically connected to the first electric machine. The first control unit is disposed within the bifurcation between the first circumferential side wall and the second circumferential side wall. The thermal management assembly includes a control unit cooling circuit. The control unit cooling circuit is connected in fluid communication with and formed by the first control unit. The control unit cooling circuit is disposed within the bifurcation between the first circumferential side wall and the second circumferential side wall.

In any of the aspects or embodiments described above and herein, all of the control unit cooling circuit may be disposed within the bifurcation.

In any of the aspects or embodiments described above and herein, the thermal management assembly may further include a coolant pump and a coolant tank, the coolant pump and the coolant tank may be connected in fluid communication with and further form the control unit cooling circuit, and the coolant pump and the coolant tank may be disposed within the bifurcation.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood; however, the following description and drawings are intended to be exemplary in nature and non-limiting.

DETAILED DESCRIPTION

Figure 1:
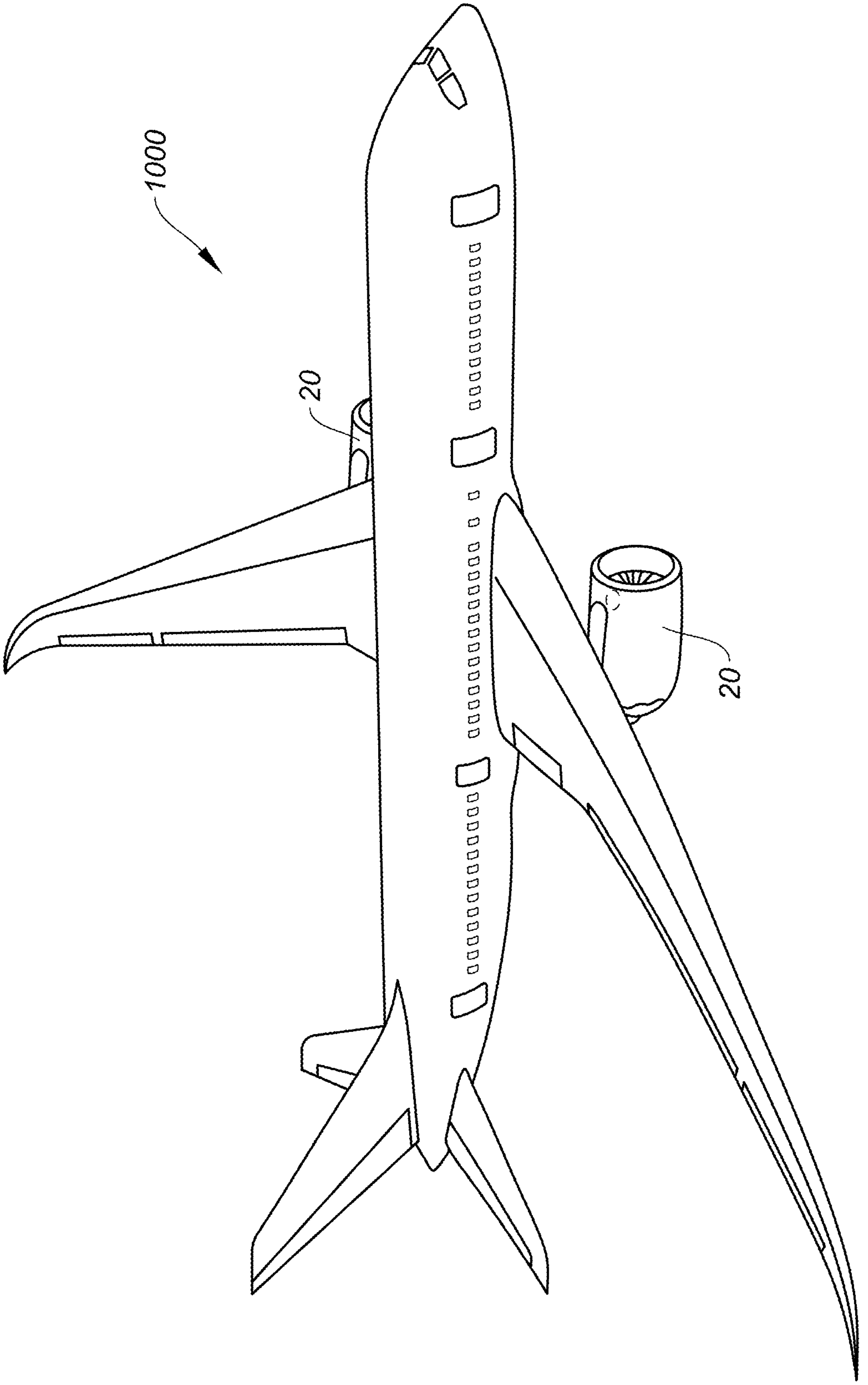
FIG. 1 illustrates a perspective view of an aircraft including a propulsion system, in accordance with one or more embodiments of the present disclosure.
Figure 2:
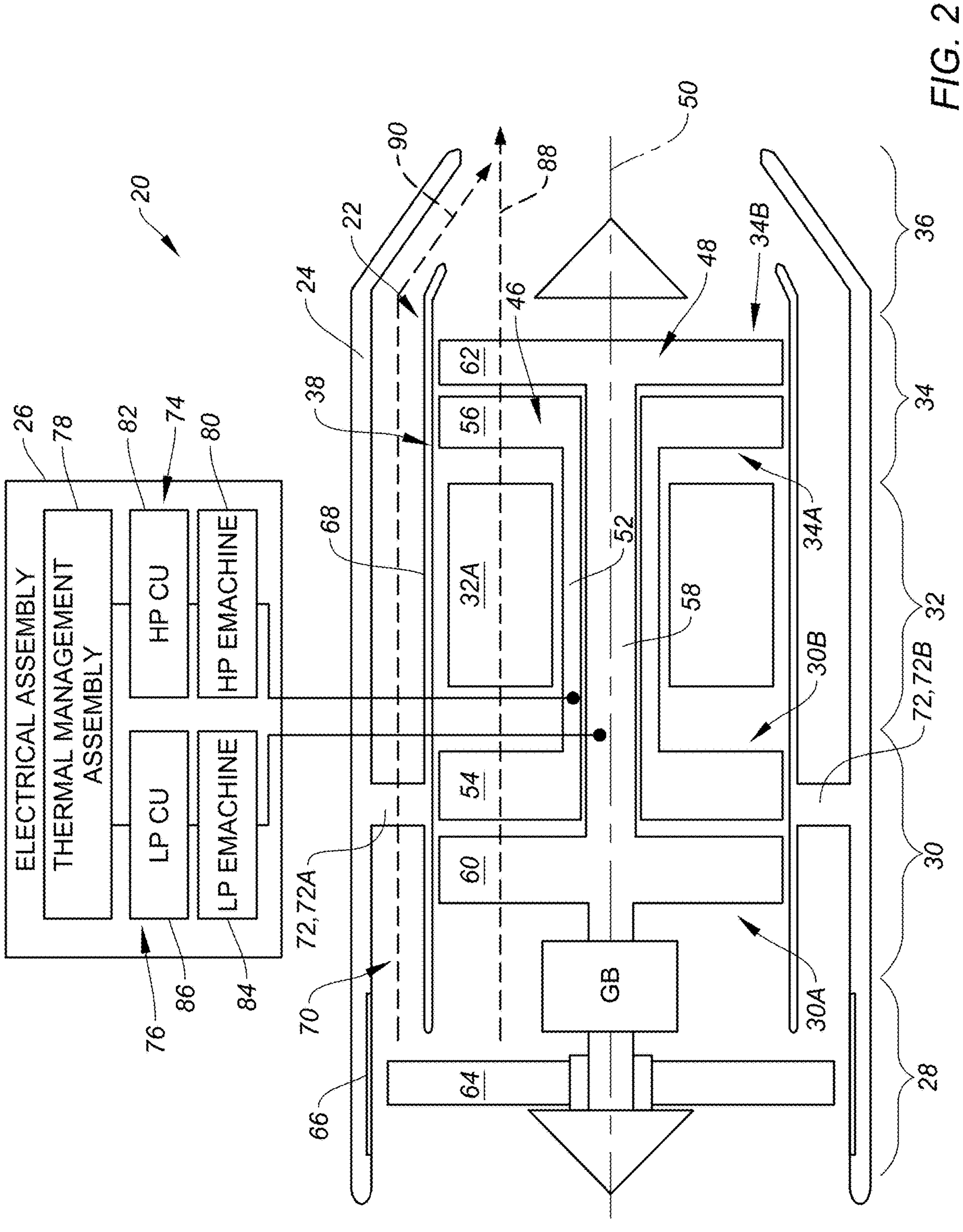
FIG. 2 schematically illustrates a cutaway, side view of a hybrid-electric propulsion system for an aircraft, in accordance with one or more embodiments of the present disclosure.

FIG. 1 illustrates a propulsion system 20 for an aircraft 1000. FIG. 2 schematically illustrates a cutaway, side view of the propulsion system 20. The propulsion system 20 of FIG. 2 is configured as a hybrid-electric propulsion system 20. The propulsion system 20 includes a gas turbine engine 22, a nacelle 24, and an electrical assembly 26.

The gas turbine engine 22 of FIG. 2 is configured as a multi-spool turbofan gas turbine engine. However, while the following description and accompanying drawings may refer to the turbofan gas turbine engine of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, and/or a propfan (e.g., an open rotor) gas turbine engine.

The gas turbine engine 22 of FIG. 2 includes a fan section 28, a compressor section 30, a combustor section 32, a turbine section 34, an exhaust section 36, and an engine static structure 38. The compressor section 30 includes a low-pressure compressor 30A and a high-pressure compressor 30B. The combustor section 32 includes a combustor 32A (e.g., an annular combustor). The turbine section 34 includes a high-pressure turbine 34A and a low-pressure turbine 34B. The compressor section 30, the combustor section 32, and the turbine section 34 may collectively be referred to as an "engine core."

Components of the fan section 28, the compressor section 30, and the turbine section 34 form a first rotational assembly 46 (e.g., a high-pressure (HP) spool) and a second rotational assembly 48 (e.g., a low-pressure (LP) spool) of the gas turbine engine 22. The first rotational assembly 46 and the second rotational assembly 48 of FIG. 2 are mounted for rotation about an axis 50 (e.g., a rotational axis and/or an axial centerline) of the gas turbine engine 22 relative to the engine static structure 38. However, the first rotational assembly 46 and/or the second rotational assembly 48 may alternatively be rotatable about another rotational axis which is (e.g., laterally and/or angularly) offset from the axis 50.

The first rotational assembly 46 includes a first shaft 52, a bladed first compressor rotor 54 for the high-pressure compressor 30B, and a bladed first turbine rotor 56 for the high-pressure turbine 34A. The first shaft 52 interconnects the bladed first compressor rotor 54 and the bladed first turbine rotor 56.

The second rotational assembly 48 includes a second shaft 58, a bladed second compressor rotor 60 for the low-pressure compressor 30A, a bladed second turbine rotor 62 for the low-pressure turbine 34B, and propulsor 64 for the fan section 28. The second shaft 58 interconnects the bladed second compressor rotor 60 and the bladed second turbine rotor 62. The propulsor 64 of FIG. 2 is configured as a bladed fan rotor. The second shaft 58 may additionally couple the propulsor 64 with the bladed second compressor rotor 60 and the bladed second turbine rotor 62. The second shaft 58 may be coupled with the propulsor 64 by a gear train (e.g., a gearbox, a reduction gear assembly, an epicyclic gear assembly, a transmission, etc.), which may enable the propulsor 64 to operate at a different (e.g., slower) rotational speed than the bladed second compressor rotor 60, the bladed second turbine rotor 62, and the second shaft 58. The first shaft 52 and the second shaft 58 are concentric and configured to rotate about the rotational axis 50. The present disclosure, however, is not limited to concentric configurations of the first shaft 52 and the second shaft 58. The gas turbine engine 22 of FIG. 2 is described above with a particular two rotational assembly (e.g., spool) arrangement. The present disclosure, however, is not limited to such an exemplary arrangement. For example, the bladed second compressor rotor 60 may be omitted to configure the bladed second turbine rotor 62 as a power turbine (PT) rotor. In another example, the gas turbine engine 22 may additionally include another rotational assembly (e.g., an intermediate speed spool) for the engine core.

The engine static structure 38 may include one or more engine cases, cowlings, and/or other non-rotating structures configured to house and/or support components of the gas turbine engine 22 sections, 30, 32, 36. The engine static structure 38 forms a portion of the propulsion system 20 structure. The engine static structure 38 of FIG. 2 includes a fan case 66 and an engine outer wall 68. The fan case 66 extends circumferentially about (e.g., completely around) the rotational axis 50 within the fan section 28. The fan case 66 is disposed radially outward of and circumscribes the propulsor 64. The engine outer wall 68 (e.g., a core or engine cowling) houses and circumscribes the compressor section 30, the combustor section 32, and the turbine section 34 (e.g., the engine core). The engine outer wall 68 extends circumferentially about (e.g., completely around) the rotational axis 50. The fan case 66 and the engine outer wall 68 may each form exterior (e.g., outer radial) portions of the gas turbine engine 22.

The nacelle 24 is configured to structurally support, house, and provide an aerodynamic cover for the propulsion system 20. The nacelle 24 may also mount or facilitate mounting of the propulsion system 20 to the aircraft 1000 (see FIG. 1), for example, at a pylon. The nacelle 24 extends circumferentially about (e.g., completely around) the rotational axis 50. The nacelle 24 extends axially along the rotational axis 50 circumscribing the gas turbine engine 22. The nacelle 24 is disposed at (e.g., on, adjacent, or proximate) and encloses the fan case 66. The nacelle 24 forms a bypass duct 70 of the propulsion system 20 radially between the engine static structure 38 (e.g., the engine outer wall 68) and the nacelle 24.

The propulsion system 20 includes opposing bifurcations 72 extending radially between and to the nacelle 24 and the engine static structure 38 (e.g., the engine outer wall 68) through the bypass duct 70. The bifurcations 72 may be formed by portions of the nacelle 24 and/or the engine static structure 38. The bifurcations 72 may additionally or alternatively be formed by structural portions (e.g., struts) of a pylon configured to support and mount the nacelle 24 and the engine static structure 38 on the aircraft 1000 (see FIG. 1). The bifurcations 72 of FIG. 2 includes an upper bifurcation 72A and a lower bifurcation 72B. The upper bifurcation 72A may be disposed at a 12 o'clock position of the propulsion system 20 and the lower bifurcation 72B may be disposed at a 6 o'clock position of the propulsion system 20.

Still referring to FIG. 2, the electrical assembly 26 of FIG. 2 includes a first electric machine assembly 74 (e.g., an "HP" electric machine assembly), a second electric machine assembly 76 (e.g., an "LP" electric machine assembly), and a thermal management assembly 78. The first electric machine assembly 74 includes a first electric machine 80 (e.g., an "HP eMachine") and a first control unit 82 ("HP CU"; e.g., a motor control unit, a generator control unit, etc.). The first electric machine 80 is coupled with the first rotational assembly 46 (e.g., the first shaft 52), for example, directly or indirectly through a gear train (e.g., a gear box, a bevel gear assembly, etc.). The first control unit 82 is electrically connected to the first electric machine 80. The second electric machine assembly 76 includes a second electric machine 84 (e.g., an "LP eMachine") and a second control unit 86 ("LP CU"; e.g., a motor control unit, a generator control unit, etc.). The second electric machine 84 is coupled with the second rotational assembly 48 (e.g., the second shaft 58), for example, directly or indirectly through a gear train (e.g., a gear box, a bevel gear assembly, etc.). The second control unit 86 is electrically connected to the second electric machine 84. While the electrical assembly 26 of FIG. 2 includes the first electric machine assembly 74 for the first rotational assembly 46 and the second electric machine assembly 76 for the second rotational assembly 48, the electrical assembly 26 may alternatively include a single electric machine assembly for one of the first rotational assembly 46 or the second rotational assembly 48. The thermal management assembly 78 of FIG. 2 is connected in fluid communication with the first control unit 82 and the second control unit 86. As will be discussed in further detail, the thermal management assembly 78 is configured to circulate a coolant through the first control unit 82 and the second control unit 86 to thermally regulate (e.g., cool) the first control unit 82 and the second control unit 86.

Each of the electric machines 80, 84 may be configurable as an electric motor and/or an electric generator (e.g., an electric motor-generator). For example, during a motor mode of operation, the electric machines 80, 84 may operate as the electric motor to convert electricity received from the respective one of the control units 82, 86 to a mechanical power output. By contrast, during a generator mode of operation, the electric machines 80, 84 may operate as the electric generator to convert a mechanical power input received from the respective one of the rotational assemblies 46, 48 into electricity. The electric machines 80, 84 of the present disclosure, however, are not limited to such exemplary operation. For example, one or both of the electric machines 80, 84 may alternatively each be configured as a dedicated electric generator (e.g., without the electric motor functionality) or as a dedicated electric motor (e.g., without the electric generator functionality).

Each of the control units 82, 86 is configured to control operation of the respective one of the electric machines 80, 84. For example, when operating as the electric motor, the respective control unit 82, 86 is configured to regulate a flow of electricity from an aircraft 1000 electrical system to the respective electric machine 80, 84. This electricity flow regulation may include: (a) turning-on the flow of electricity from the aircraft 1000 electrical system to the respective electric machine 80, 84 (e.g., electrically coupling the respective electric machine 80, 84 to the aircraft 1000 electrical system); (b) turning-off the flow of electricity from the aircraft 1000 electrical system to the respective electric machine 80, 84 (e.g., electrically decoupling the respective electric machine 80, 84 from the aircraft 1000 electrical system); (c) moderating the flow of electricity from the aircraft 1000 electrical system to the respective electric machine 80, 84 (e.g., to control a rotation speed and/or torque of the respective electric machine 80, 84). Here, the respective control unit 82, 86 operates as a motor controller. In another example, when operating as the electric generator, the respective control unit 82, 86 is configured to regulate a flow of electricity from the respective electric machine 80, 84 to the aircraft 1000 electrical system. This electricity flow regulation may include: (a) turning-on the flow of electricity from the respective electric machine 80, 84 to the aircraft 1000 electrical system (e.g., electrically coupling the respective electric machine 80, 84 to the aircraft 1000 electrical system); (b) turning-off the flow of electricity from the respective electric machine 80, 84 to the aircraft 1000 electrical system (e.g., electrically decoupling the respective electric machine 80, 84 from the aircraft 1000 electrical system); (c) moderating the flow of electricity from the respective electric machine 80, 84 to the aircraft 1000 electrical system. Here, the respective control unit 82, 86 operates as a generator controller.

The control units 82, 86 may be connected in signal communication with and controlled by an electronic engine control (EEC) unit, a full authority digital engine control (FADEC) unit, or another control unit of the propulsion system 20 or its gas turbine engine 22. The electric machines 80, 84 and the control units 82, 86 may typically be located in different portions of the propulsion system 20. For example, the electric machines 80, 84 may be disposed within the engine static structure 38 at (e.g., on, adjacent, or proximate) the rotational assemblies 46, 48 and/or a gear train (e.g., an accessory gearbox) coupled with the rotational assemblies 46, 48. In contrast, the control units 82, 86 may be disposed within one of the bifurcations 72, as will be discussed in further detail.

In operation of the gas turbine engine 22 of FIG. 2, ambient air is directed through the fan section 28 and into a core flow path 88 (e.g., an annular flow path) and a bypass flow path 90 (e.g., an annular flow path) by rotation of the propulsor 64. Air flow along the core flow path 88 is compressed by the low-pressure compressor 30A and the high-pressure compressor 30B, mixed and burned with fuel in the combustor 32A, directed through the high-pressure turbine 34A and the low-pressure turbine 34B, and then exhausted from the propulsion system 20 through the exhaust section 36. The bladed first turbine rotor 56 and the bladed second turbine rotor 62 rotationally drive the first rotational assembly 46 and the second rotational assembly 48, respectively, in response to the combustion gas flow through the high-pressure turbine 34A and the low-pressure turbine 34B. Air flow along the bypass flow path 90 is directed through the bypass duct 70. The first electric machine 80 and/or the second electric machine 84 may be selectively operated to apply rotational force to the first rotational assembly 46 and/or the second rotational assembly 48, respectively. The first electric machine 80 and/or the second electric machine 84 may alternatively be driven by the first rotational assembly 46 and/or the second rotational assembly 48, respectively to generate electrical power for the electrical assembly 26 (e.g., an electrical distribution system of the aircraft 1000 and/or the propulsion system 20).

Figure 3:
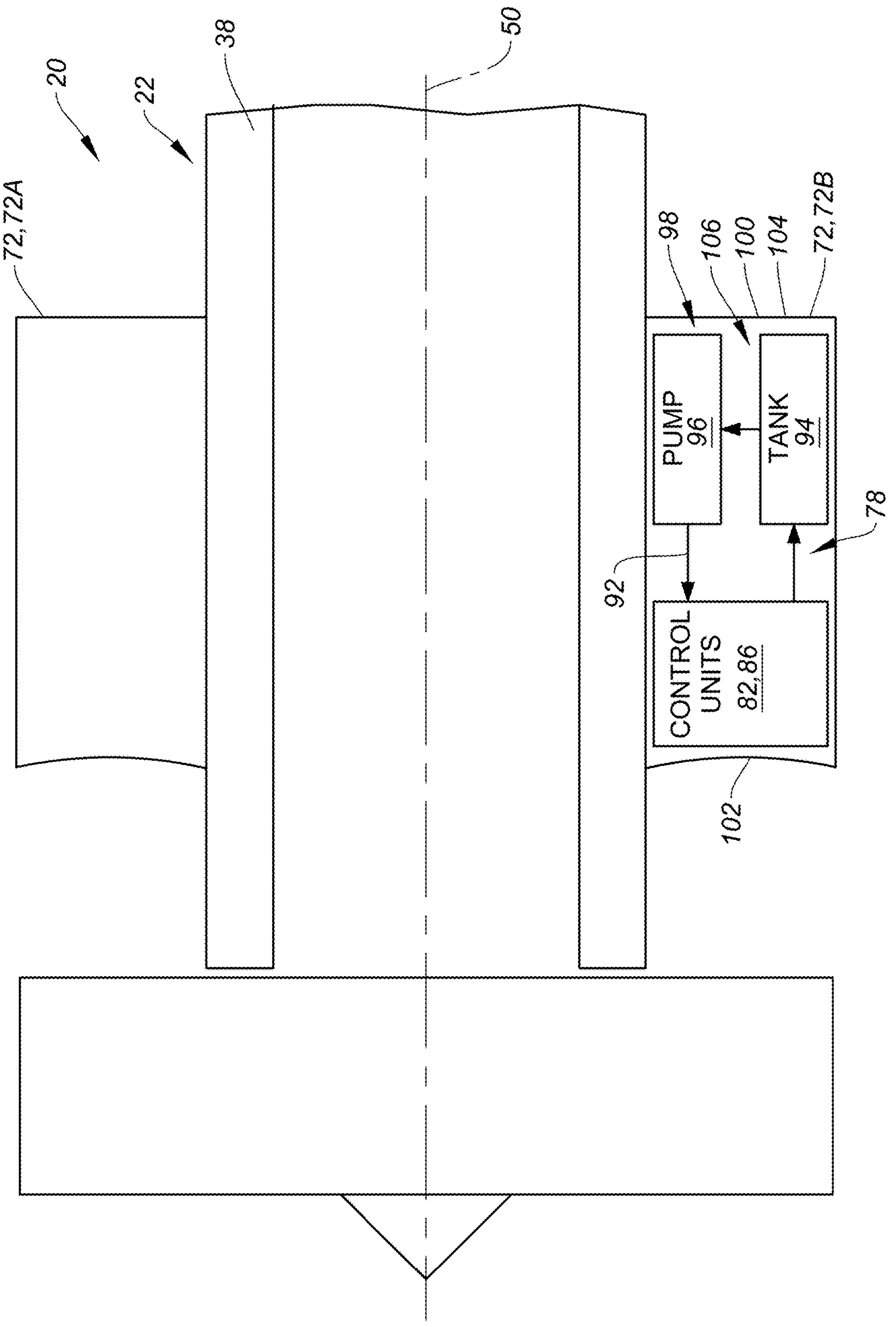
FIG. 3 schematically illustrates a side view of the propulsion system and a thermal management assembly, in accordance with one or more embodiments of the present disclosure.

FIG. 3 schematically illustrates the thermal management assembly 78. Components of the thermal management assembly 78 form a control unit cooling circuit 92. The control unit cooling circuit 92 is configured to circulate a liquid coolant fluid (e.g., oil, refrigerants, ammonia-based coolants, ethylene glycol (EG), propylene glycol (PG), or propylene glycol with water (PGW), etc.) through the first control unit 82 and/or the second control unit 86 to facilitate thermal management (e.g., cooling) of the first control unit 82 and/or the second control unit 86. The thermal management assembly 78 of FIG. 3 includes a coolant tank 94 and a coolant pump 96 forming the control unit cooling circuit 92. The control unit cooling circuit 92 may be further formed by other components such as, but not limited to, valves, filters, regulators, and the like. Fluid interconnections between components of the thermal management assembly 78 may be made by any suitable conduit (e.g., pipe, hose, tube, etc.). The coolant pump 96 is configured to circulate (e.g., pump) the coolant from the coolant tank 94 through the control units 82, 86 along the control unit cooling circuit 92.

The control unit cooling circuit 92 is disposed within one of the bifurcations 72 and forms a bifurcation heat exchanger assembly 98 with the one of the bifurcations 72. The bifurcation heat exchanger assembly 98 of FIG. 3 is formed by the lower bifurcation 72B; however, the bifurcation heat exchanger assembly 98 may alternatively be formed by the upper bifurcation 72A. The bifurcation 72 (e.g., the lower bifurcation 72B) includes a bifurcation body 100. The bifurcation body 100 extends (e.g., axially extends) between and to a leading edge 102 of the bifurcation body 100 and a trailing edge 104 of the bifurcation body 100. The bifurcation body 100 forms an internal cavity 106. As shown in FIG. 3, the bifurcation body 100 houses the control units 82, 86 and the control unit cooling circuit 92 including components of the thermal management assembly 78 forming the control unit cooling circuit 92 (e.g., the coolant tank 94, the coolant pump 96, etc.). In other words, the control units 82, 86 and the control unit cooling circuit 92 (e.g., the entire control unit cooling circuit 92) are disposed within the internal cavity 106.

Figure 4:
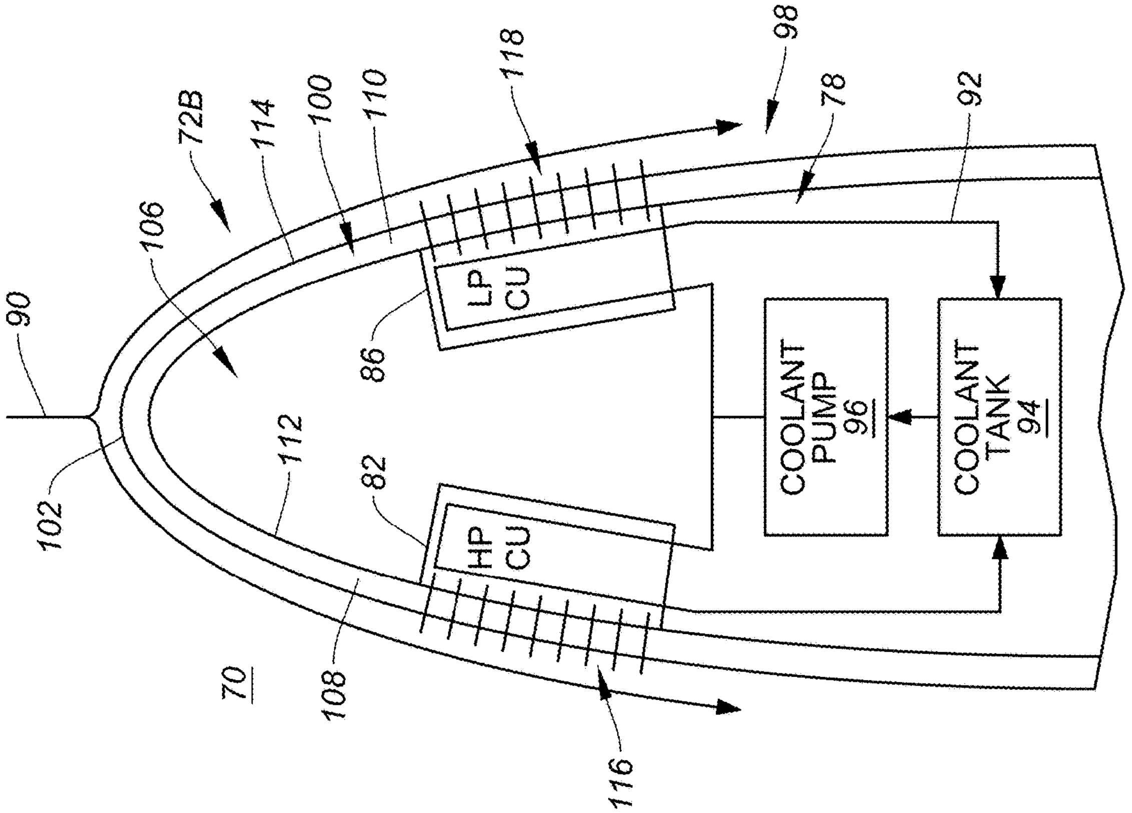
FIG. 4 schematically illustrates a thermal management assembly within a bifurcation of the propulsion system, in accordance with one or more embodiments of the present disclosure.

Referring to FIG. 4, an embodiment of the bifurcation heat exchanger assembly 98 is provided. FIG. 4 schematically illustrates a cutaway view of the lower bifurcation 72B showing the control units 82, 86 and the bifurcation heat exchanger assembly 98. As shown in FIG. 4, the bifurcation body 100 includes a first circumferential side wall 108 and an opposing second circumferential side wall 110. The first circumferential side wall 108 and the second circumferential side wall 110 intersect at the leading edge 102 and extend (e.g., axially extend) from the leading edge 102 to or toward the trailing edge 104 (see FIG. 3). The first circumferential side wall 108 and the second circumferential side wall 110 may form an airfoil profile of the bifurcation body 100. The bifurcation body 100 and its circumferential side walls 108, 110 extend between and to an inner side surface 112 and an outer side surface 114. The inner side surface 112 forms the internal cavity 106. The outer side surface 114 forms an exterior aerodynamic surface of the bifurcation body 100 within the bypass duct 70.

The first control unit 82 is disposed at (e.g., on, adjacent, or proximate) the first circumferential side wall 108. For example, the first control unit 82 may be mounted onto the first circumferential side wall 108 at (e.g., on, adjacent, or proximate) the inner side surface 112. The first control unit 82 forms a portion of the control unit cooling circuit 92. Along a portion of the control unit cooling circuit 92 within the first control unit 82, the first control unit 82 includes a plurality of plate fins 116. The plate fins 116 are disposed at (e.g., on, adjacent, or proximate) the control unit cooling circuit 92 within the first control unit 82. For example, the plate fins 116 may form a portion of the control unit cooling circuit 92 or may otherwise be connected to a conduit forming a portion of the control unit cooling circuit 92 through the first control unit 82. The plate fins 116 extend from the first control unit 82, through the first circumferential side wall 108, to an exterior of the bifurcation body 100. The plate fins 116 of FIG. 4 project outward from the outer side surface 114 of the first circumferential side wall 108.

The second control unit 86 is disposed at (e.g., on, adjacent, or proximate) the second circumferential side wall 110. For example, the second control unit 86 may be mounted onto the second circumferential side wall 110 at (e.g., on, adjacent, or proximate) the inner side surface 112. The second control unit 86 forms a portion of the control unit cooling circuit 92. The portion of control unit cooling circuit 92 formed by the second control unit 86 and the portion of the control unit cooling circuit 92 formed by the first control unit 82 may have a parallel fluid connect as shown, for example, in FIG. 4. Along a portion of the control unit cooling circuit 92 within the second control unit 86, the second control unit 86 includes a plurality of plate fins 118. The plate fins 118 are disposed at the control unit cooling circuit 92 within the second control unit 86. For example, the plate fins 118 may form a portion of the control unit cooling circuit 92 or may otherwise be connected to a conduit forming a portion of the control unit cooling circuit 92 through the second control unit 86. The plate fins 118 extend from the second control unit 86, through the second circumferential side wall 110, to an exterior of the bifurcation body 100. The plate fins 118 of FIG. 4 project outward from the outer side surface 114 of the second circumferential side wall 110.

In operation, the coolant pump 96 directs (e.g., pumps) coolant from the coolant tank 94 into and through the first control unit 82 and the second control unit 86. Air flow along the bypass flow path 90 flows along the first circumferential side wall 108 and the second circumferential side wall 110. The plate fins 116, 118 facilitate heat transfer from the coolant flowing through the control units 82, 86 to the bypass air flow outside the lower bifurcation 72B. The coolant is then directed from the control units 82, 86 back to the coolant tank 94.

Figure 5:
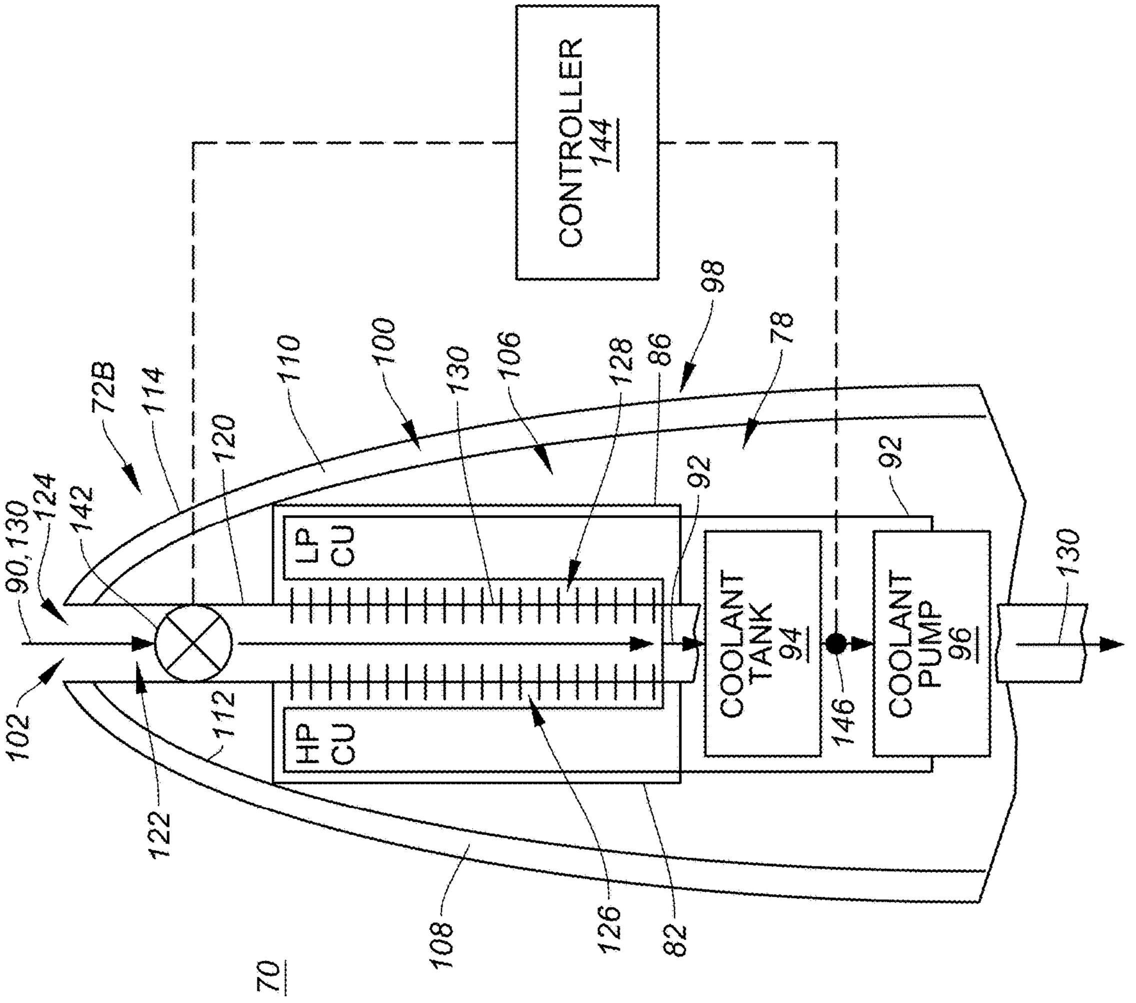
FIG. 5 schematically illustrates another thermal management assembly within a bifurcation of the propulsion system, in accordance with one or more embodiments of the present disclosure.

Referring to FIG. 5, another embodiment of the bifurcation heat exchanger assembly 98 is provided. FIG. 5 schematically illustrates a cutaway view of the lower bifurcation 72B showing the control units 82, 86 and the bifurcation heat exchanger assembly 98. The bifurcation body 100 of FIG. 5 includes a conduit 120 forming an air passage 122 through the lower bifurcation 72B. The conduit 120 forms an air inlet 124 of the air passage 122 at the leading edge 102.

The first control unit 82 is disposed at (e.g., on, adjacent, or proximate) the conduit 120. For example, the first control unit 82 may be connected to the conduit 120 and disposed between the conduit 120 and the first circumferential side wall 108. The first control unit 82 forms a portion of the control unit cooling circuit 92. Along a portion of the control unit cooling circuit 92 within the first control unit 82, the first control unit 82 includes a plurality of plate fins 126. The plate fins 126 are disposed at the control unit cooling circuit 92 within the first control unit 82. For example, the plate fins 126 may form a portion of the control unit cooling circuit 92 or may otherwise be connected to a conduit forming a portion of the control unit cooling circuit 92 through the first control unit 82. The plate fins 126 extend from the first control unit 82, through the conduit 120, and into the air passage 122.

The second control unit 86 is disposed at (e.g., on, adjacent, or proximate) the conduit 120. For example, the second control unit 86 may be connected to the conduit 120 and disposed between the conduit 120 and the second circumferential side wall 110. The second control unit 86 forms a portion of the control unit cooling circuit 92. The portion of control unit cooling circuit 92 formed by the second control unit 86 and the portion of the control unit cooling circuit 92 formed by the first control unit 82 may have a parallel fluid connect as shown, for example, in FIG. 5. Along a portion of the control unit cooling circuit 92 within the second control unit 86, the second control unit 86 includes a plurality of plate fins 128. The plate fins 128 are disposed at the control unit cooling circuit 92 within the second control unit 86. For example, the plate fins 128 may form a portion of the control unit cooling circuit 92 or may otherwise be connected to a conduit forming a portion of the control unit cooling circuit 92 through the second control unit 86. The plate fins 128 extend from the second control unit 86, through the conduit 120, and into the air passage 122.

In operation, the coolant pump 96 directs (e.g., pumps) coolant from the coolant tank 94 into and through the first control unit 82 and the second control unit 86. The conduit 120 directs air flow from the bypass flow path 90 through the air passage 122 along an air flow path 130. The plate fins 126, 128 facilitate heat transfer from the coolant flowing through the control units 82, 86 to the air flow along the air flow path 130. The coolant is then directed from the control units 82, 86 back to the coolant tank 94.

Figure 6:
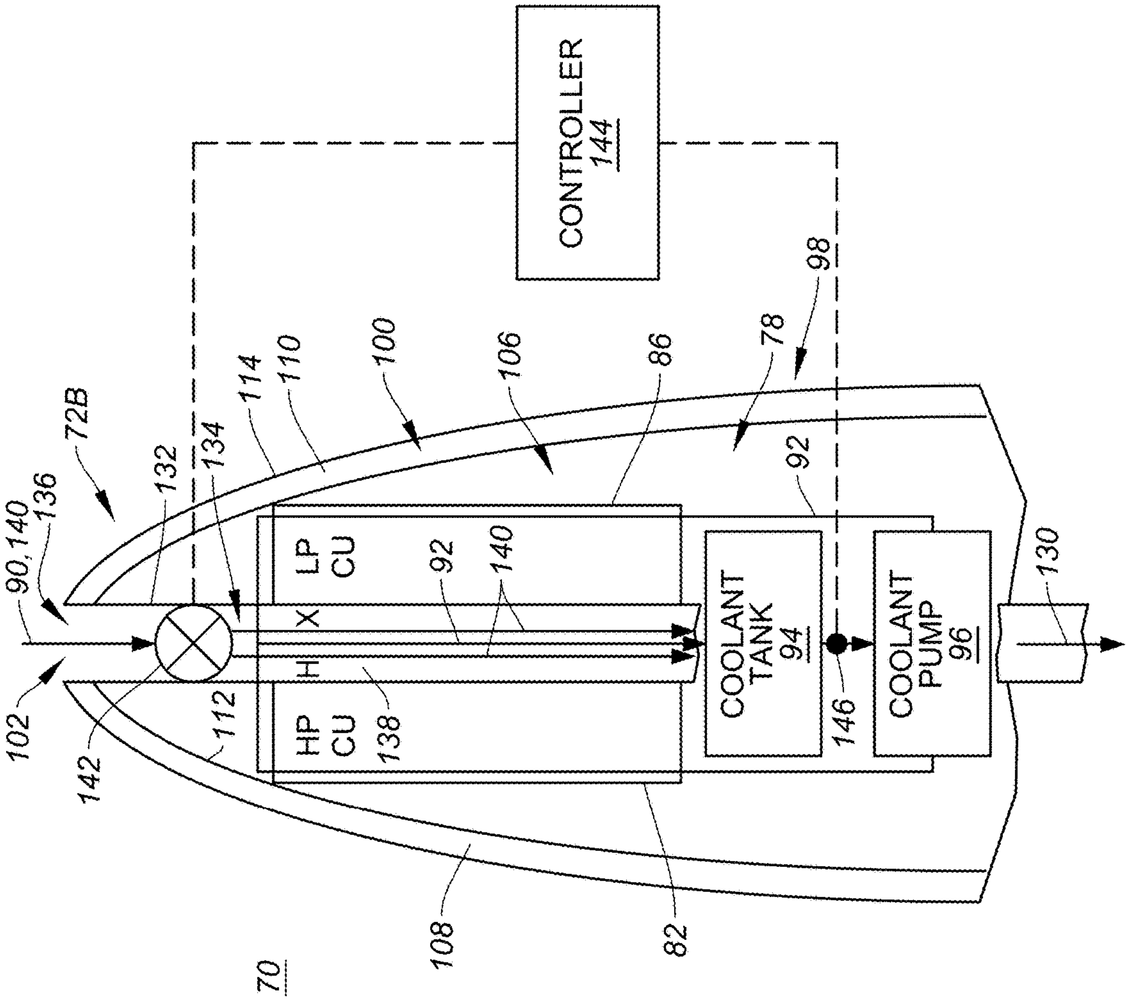
FIG. 6 schematically illustrates yet another thermal management assembly within a bifurcation of the propulsion system, in accordance with one or more embodiments of the present disclosure.

Referring to FIG. 6, another embodiment of the bifurcation heat exchanger assembly 98 is provided. FIG. 6 schematically illustrates a cutaway view of the lower bifurcation 72B showing the control units 82, 86 and the bifurcation heat exchanger assembly 98. The bifurcation body 100 of FIG. 6 includes a conduit 132 forming an air passage 134 through the lower bifurcation 72B. The conduit 132 forms an air inlet 136 of the air passage 134 at the leading edge 102. The thermal management assembly 78 of FIG. 6 includes an air-coolant heat exchanger 138 further forming the control unit cooling circuit 92.

The air-coolant heat exchanger 138 is connected in fluid communication with and further forms the air passage 134. The control unit cooling circuit 92 forms a primary side of the air-coolant heat exchanger 138 and the air passage 134 forms a secondary side of the air-coolant heat exchanger 138.

The first control unit 82 and the second control unit 86 each form respective portions of the control unit cooling circuit 92. The portion of control unit cooling circuit 92 formed by the second control unit 86 and the portion of the control unit cooling circuit 92 formed by the first control unit 82 may have a parallel fluid connect as shown, for example, in FIG. 6. The first control unit 82 and the second control unit 86 of FIG. 6 are disposed at the air-coolant heat exchanger 138; however, the present disclosure is not limited to any particular positions of the control units 82, 86 relative to the air-coolant heat exchanger 138 within the bifurcation body 100.

In operation, the coolant pump 96 directs (e.g., pumps) coolant from the coolant tank 94 into and through the first control unit 82 and the second control unit 86, and then through the air-coolant heat exchanger 138. The conduit 132 directs air flow from the bypass flow path 90 through the air passage 134 along an air flow path 140 into and through the air-coolant heat exchanger 138. The air-coolant heat exchanger 138 facilitates heat transfer from the coolant to the air flow along the air flow path 140. The coolant is then directed from the air-coolant heat exchanger 138 back to the coolant tank 94.

Referring to FIGS. 5 and 6, in some embodiments the thermal management assembly 78 may further include an air flow modulation valve 142. The modulation valve 142 may be disposed at the air passage 122, 134 downstream of the air inlet 124, 136 to control air flow supplied to the control units 82, 86 or the air-coolant heat exchanger 138 through the air passage 122, 134. The modulation valve 142 may be positionable in an open position, a closed position, and a plurality of intermediate positions to (1) direct air flow from the bypass flow path 90 to the control units 82, 86 or the air-coolant heat exchanger 138 through the air passage 122, 134, (2) isolate air flow from the bypass flow path 90 to the control units 82, 86 or the air-coolant heat exchanger 138 through the air passage 122, 134, or (3) modulate a flow rate of the air flow directed from the bypass flow path 90 to the control units 82, 86 or the air-coolant heat exchanger 138 through the air passage 122, 134.

In some embodiments, the thermal management assembly 78 may further include a controller 144 or functions thereof may be implemented using a controller (e.g., a "shared controller") dedicated to perform other functionality as well as the functionality described herein. A non-limiting example of a "shared controller" is the electronic engine control (EEC). Regardless of whether a dedicated controller or a "shared controller" is used, the controller 144 may be connected in communication with the modulation valve 142 to control the operation of the modulation valve 142 (e.g., to effect positioning of the modulation valve 142 in its open, closed, or intermediate positions). The controller 144 may include one or more of any type of computing device, computational circuit, processor(s), CPU, computer, or the like (collectively referred to as a "control device") capable of executing a series of instructions that are stored in memory. In those embodiments wherein the controller 144 includes more than one control device, the control devices may be in communication with one another and may be disposed in any architecture that is capable of achieving the functionality described herein. The instructions may include an operating system, and/or executable software modules such as program files, system data, buffers, drivers, utilities, and the like. The executable instructions may apply to any functionality described herein to enable the inspection system to accomplish the same algorithmically and/or coordination of system components. The controller 144 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 144 may include, or may be in communication with, an input device (not shown) that enables a user to enter data and/or instructions, and may include, or be in communication with, an output device configured, for example to display information (e.g., a visual display, or the like), or to transfer data, etc. Communications between the controller 144 and other system components may be via a hardwire connection or via a wireless connection.

As shown in FIGS. 5 and 6, the controller 144 may be connected in communication with the modulation valve 142 to control the operation of the modulation valve 142 to (1) direct air flow from the bypass flow path 90 to the control units 82, 86 or the air-coolant heat exchanger 138 through the air passage 122, 134, (2) isolate air flow from the bypass flow path 90 to the control units 82, 86 or the air-coolant heat exchanger 138 through the air passage 122, 134, or (3) module a flow rate of the air flow directed from the bypass flow path 90 to the control units 82, 86 or the air-coolant heat exchanger 138 through the air passage 122, 134. The controller 144 may control operation of the modulation valve 142 based on a measured temperature of the coolant of the control unit cooling circuit 92. For example, the controller 144 of FIGS. 5 and 6 is connected in signal communication with a temperature sensor 146 disposed at the control unit cooling circuit 92. The temperature sensor 146 of FIGS. 5 and 6 is disposed on the control unit cooling circuit 92 between the coolant tank 94 and the coolant pump 96; however, the present disclosure is not limited to any particular location of the temperature sensor 146 on the control unit cooling circuit 92. For example, one or more temperature sensors 146 may additionally or alternatively be located proximate the control units 82, 86. The controller 144 may control a position of the modulation valve 142 based on a temperature output signal of the temperature sensor 146. For example, the controller 144 may control the modulation valve 142 to open (e.g., fully or incrementally) in response to identifying the measured coolant temperature is greater than or equal to a temperature threshold. Similarly, the controller 144 may control the modulation valve 142 to close (e.g., fully or incrementally) in response to identifying the measured coolant temperature is less than or equal to a temperature threshold.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A hybrid-electric aircraft propulsion system comprising:

a gas turbine engine having an axis, the gas turbine engine comprising a first rotational assembly and an engine static structure, the first rotational assembly comprises a first shaft, a bladed first compressor rotor, and a bladed first turbine rotor, the first shaft interconnecting the bladed first compressor rotor and the bladed first turbine rotor, the engine static structure housing the first rotational assembly;

a nacelle forming an exterior aerodynamic housing of the hybrid-electric aircraft propulsion system and circumscribing the gas turbine engine, the nacelle forming an annular bypass duct radially between the engine static structure and the nacelle;

a bifurcation extending radially through the annular bypass duct between the engine static structure and the nacelle;

an electrical assembly comprising a first electric machine and a first control unit, the first electric machine being coupled with the first rotational assembly, the first control unit being electrically connected to the first electric machine, the first control unit disposed within the bifurcation; and a thermal management assembly comprising a control unit cooling circuit, the control unit cooling circuit connected in fluid communication with and formed by the first control unit, the control unit cooling circuit disposed within the bifurcation;

wherein all of the control unit cooling circuit is disposed within the bifurcation.

2. The hybrid-electric aircraft propulsion system of claim 1, wherein the thermal management assembly further comprises a coolant pump, the coolant pump is connected in fluid communication with and further forms the control unit cooling circuit, and the coolant pump is disposed within the bifurcation.

3. The hybrid-electric aircraft propulsion system of claim 2, wherein the thermal management assembly further comprises a coolant tank, the coolant tank is connected in fluid communication with and further forms the control unit cooling circuit, and the coolant tank is disposed within the bifurcation.

4. The hybrid-electric aircraft propulsion system of claim 1, wherein the hybrid-electric aircraft propulsion system comprises an upper bifurcation and a lower bifurcation each extending radially between the engine static structure and the nacelle, and the lower bifurcation is the bifurcation.

5. The hybrid-electric aircraft propulsion system of claim 1, wherein:

the gas turbine engine further comprises a second rotational assembly, the second rotational assembly comprises a second shaft, a bladed second compressor rotor, and a bladed second turbine rotor, and the second shaft interconnects the bladed second compressor rotor and the bladed second turbine rotor;

the electrical assembly comprises a second electric machine and a second control unit, the second electric machine is coupled with the second rotational assembly, and the second control unit is electrically connected to the second electric machine; and the control unit cooling circuit is further connected in fluid communication with and formed by the second control unit.

6. The hybrid-electric aircraft propulsion system of claim 5, wherein the first control unit and the second control unit are connected in parallel by the control unit cooling circuit.

7. The hybrid-electric aircraft propulsion system of claim 1, wherein the bifurcation comprises a bifurcation body housing the first control unit and the thermal management assembly, the bifurcation body forms an outer side surface of the bifurcation, the first control unit comprises a plurality of plate fins extending from the first control unit through the bifurcation body to the outer side surface, and the plurality of plate fins are disposed at the control unit cooling circuit within the first control unit.

8. The hybrid-electric aircraft propulsion system of claim 7, wherein the bifurcation body comprises a first circumferential side wall and a second circumferential side wall, the first control unit is mounted on the first circumferential side wall, and the plate fins extend through the first circumferential side wall and the outer side surface.

9. The hybrid-electric aircraft propulsion system of claim 1, wherein the bifurcation comprises a conduit extending through the bifurcation, the conduit forms an air passage, and the first control unit comprises a plurality of plate fins extending from the first control unit through the conduit to the air passage.

10. The hybrid-electric aircraft propulsion system of claim 9, wherein the bifurcation comprises a bifurcation body, the bifurcation body comprises a leading edge, and the conduit forms an air inlet of the air passage at the leading edge.

11. The hybrid-electric aircraft propulsion system of claim 1, wherein the bifurcation comprises a conduit extending through the bifurcation, the conduit forms an air passage, the thermal management assembly comprises an air-coolant heat exchanger further forming the control unit cooling circuit, and the air-coolant heat exchanger is connected in fluid communication with air passage.

12. The hybrid-electric aircraft propulsion system of claim 1, wherein the bifurcation comprises a conduit extending through the bifurcation, the conduit forms an air passage connected in fluid communication with the thermal management assembly, the thermal management assembly further comprises a modulation valve at the air passage, and the modulation valve is positionable in an open position, a closed position, and a plurality of intermediate positions.

13. The hybrid-electric aircraft propulsion system of claim 12, further comprising a controller connected in communication with the modulation valve and a temperature sensor disposed at the control unit cooling circuit, the controller comprising a processor connected in signal communication with a non-transitory memory storing instructions which, when executed by the processor, cause the processor to:

determine a coolant temperature using the temperature sensor; and control a position of the modulation valve based on the coolant temperature.

14. A method of thermally managing an electrical assembly of a hybrid-electric aircraft propulsion system comprising a gas turbine engine and a nacelle, the gas turbine engine having an axis, the gas turbine engine comprising a first rotational assembly and an engine static structure, the first rotational assembly comprising a first shaft, a bladed first compressor rotor, and a bladed first turbine rotor, the first shaft interconnecting the bladed first compressor rotor and the bladed first turbine rotor, the engine static structure housing the first rotational assembly, the nacelle forming an exterior aerodynamic housing of the hybrid-electric aircraft propulsion system and circumscribing the gas turbine engine, the nacelle forming an annular bypass duct radially between the engine static structure and the nacelle, the method comprising:

circulating a coolant through a control unit cooling circuit in fluid communication with a control unit of the electrical assembly, the control unit being electrically connected to an electric machine, the electric machine being mechanically coupled with the first rotational assembly, the control unit and the control unit cooling circuit being disposed within a bifurcation extending radially through the annular bypass duct and connecting the nacelle and the engine static structure;

directing a bypass air flow from a propulsor to the bifurcation; and transferring heat from the coolant to the bypass air flow at the bifurcation;

wherein the bifurcation comprises a bifurcation body housing the control unit and a thermal management assembly including the control unit cooling circuit, the bifurcation body forming an outer side surface of the bifurcation, the control unit comprising a plurality of plate fins extending from the control unit through the bifurcation body to the outer side surface, and the plurality of plate fins disposed at the control unit cooling circuit within the control unit.

15. The method of claim 14, wherein directing the bypass air flow from the propulsor to the bifurcation includes directing the bypass air flow across an exterior of the bifurcation, and transferring the heat from the coolant to the bypass air flow at the bifurcation includes transferring the heat from the coolant to the bypass air flow at the exterior.

16. A hybrid-electric aircraft propulsion system comprising:

a propulsor;

an engine coupled with the propulsor, the engine comprising an engine static structure;

a nacelle forming an exterior aerodynamic housing the engine;

a bifurcation extending between the engine static structure and the nacelle, the bifurcation including a bifurcation body extending between a leading edge and a trailing edge, the bifurcation body comprising a first circumferential side wall and a second circumferential side wall extending from the leading edge toward the trailing edge;

an electrical assembly comprising a first electric machine and a first control unit, the first electric machine being coupled with the propulsor, the first control unit being electrically connected to the first electric machine, the first control unit disposed within the bifurcation between the first circumferential side wall and the second circumferential side wall; and a thermal management assembly comprising a control unit cooling circuit, a coolant pump, and a coolant tank, the control unit cooling circuit connected in fluid communication with and formed by the first control unit, the control unit cooling circuit disposed within the bifurcation between the first circumferential side wall and the second circumferential side wall, the coolant pump and the coolant tank connected in fluid communication with and further forming the control unit cooling circuit, the coolant pump and the coolant tank disposed within the bifurcation.

17. The hybrid-electric aircraft propulsion system of claim 16, wherein all of the control unit cooling circuit is disposed within the bifurcation.

* * * * *